(12) United States Patent
Pesonen

(10) Patent No.: US 7,664,506 B2
(45) Date of Patent: Feb. 16, 2010

(54) ARRANGEMENT AND METHOD FOR CAPACITY MANAGEMENT IN COMMUNICATION SYSTEM

(75) Inventor: Tero Pesonen, Helsinki (FI)

(73) Assignee: EADS Secure Networks Oy, Helsinki (FI)

( * ) Notice: Subject to any disclaimer, the term of this patent is extended or adjusted under 35 U.S.C. 154(b) by 365 days.

(21) Appl. No.: 10/366,708

(22) Filed: Feb. 14, 2003

(65) Prior Publication Data

US 2004/0137881 A1    Jul. 15, 2004

Related U.S. Application Data

(60) Provisional application No. 60/438,766, filed on Jan. 9, 2003.

(51) Int. Cl.
*H04W 72/00* (2009.01)
(52) U.S. Cl. .................... 455/450; 455/451; 455/452.1; 455/452.2; 455/453
(58) Field of Classification Search .............. 455/452.1, 455/450, 451, 435, 509, 453, 516, 452, 452.2, 455/518, 519
See application file for complete search history.

(56) References Cited

U.S. PATENT DOCUMENTS

| | | | | |
|---|---|---|---|---|
| 5,528,664 A | * | 6/1996 | Slekys et al. | 455/452.1 |
| 5,666,655 A | * | 9/1997 | Ishikawa et al. | 455/512 |
| 5,950,136 A | * | 9/1999 | Scott | 455/452.1 |
| 5,974,106 A | | 10/1999 | Dupont et al. | |
| 6,081,720 A | * | 6/2000 | Sampson | 455/450 |
| 6,449,491 B1 | * | 9/2002 | Dailey | 455/518 |
| 6,487,183 B1 | | 11/2002 | Lo et al. | |
| 2002/0183066 A1 | * | 12/2002 | Pankaj | 455/450 |
| 2003/0007456 A1 | * | 1/2003 | Gupta et al. | 370/232 |
| 2004/0005904 A1 | * | 1/2004 | Wolf et al. | 455/519 |

FOREIGN PATENT DOCUMENTS

| | | |
|---|---|---|
| EP | 0 782 299 A2 | 7/1997 |
| WO | WO 00/60896 | 10/2000 |
| WO | WO 01/20930 A1 | 3/2001 |
| WO | WO 02/054809 A1 | 7/2002 |
| WO | WO 03/001725 A1 | 1/2003 |

\* cited by examiner

*Primary Examiner*—Vincent P Harper
*Assistant Examiner*—Dung Lam
(74) *Attorney, Agent, or Firm*—Squire, Sanders & Dempsey L.L.P.

(57) ABSTRACT

A communication system includes a plurality of channels, a first service that utilizes at least a first channel for transmission, and a second service that utilizes at least a second channel for transmission. Operating means are provided for operating the first service in connection with the second service, so that the first service can utilize the second channel. Adjusting means are provided for adjusting the utilization of the second channel by the second service at least during the connected operation of the first and the second service. The utilization of a channel whose capacity is essentially dynamically adjustable is facilitated by a service that, according to the pre-defined protocols, is directed to use a channel whose capacity is more statically adjustable.

27 Claims, 3 Drawing Sheets

ARRANGEMENT AND METHOD FOR CAPACITY MANAGEMENT IN COMMUNICATION SYSTEM

REFERENCE TO RELATED APPLICATIONS

This application claims priority of U.S. Provisional patent application Ser. No. 60/438,766 entitled "Arrangement and Method for Capacity Management in Communication System," filed on Jan. 9, 2003, the contents of which are hereby incorporated by reference.

BACKGROUND OF THE INVENTION

1. Field of the Invention

The present invention relates to communication systems, and in particular to capacity management in communication systems.

2. Description of the Related Art

In communication systems, the functionality of the system is generally defined in the form of protocols, formal statements of the procedures that are adopted to ensure communication between two or more functions within the same layer of a hierarchy of functions. This means that the devices must follow the defined protocol to implement a connection between them. The protocol can be based on a proprietary statement and thus be a result of agreements and decisions made during the creation process of the product or a release of the product. The protocol can also be agreed in co-operation with representatives of the different fields in the industry. During the recent years, standardisation and de facto standards have, due to the customer benefit introduced therewith, made a huge impact on the communication market.

While the released system typically provides an optimised solution to the needs and problems identified and considered during its creation, it is evident that one solution cannot be optimally suitable for all purposes as such. In capacity considerations, the problem typically originates from the fact that the traffic profiles created by the special modes of operation in the realised network differ quite far from the normative ones that have been used as a basis for standardisation. Therefore, the real traffic, when processed according to the pre-defined protocols, will correspondingly accumulate unevenly into the specified channels of the system, and potentially one or more of the channels will get congested. Although in modern solutions the possibility to increase and decrease the number of system elements allows a lot of latitude to capacity planning, dimensioning the whole system according to one, essentially dominating parameter does not necessarily lead to an optimised network configuration, especially when the related costs are considered.

Taking an example from telecommunication, in the early stages of the GSM (Global System for Mobile Communications) breakthrough, it became evident that the critical needs of the mobile professional users could not be met with this mainstream technology. Appreciating this, and considering the predicted potential market of public safety and professional cellular users, TETRA (TErrestial Trunked RAdio), an open digital Trunked radio standard, was defined under the auspices of ETSI (European Telecommunications Standards Institute). As the number of TETRA implementations in the public safety sector is growing, the interest to benefit from the valuable combination of advanced services and reasonable costs provided by TETRA is correspondingly increasing in the other professional user segments as well.

Examples of the above are the public transportation companies, for which TETRA has been considered as a favourable technology. This is largely due to the fact that they need to provide advanced communication to complex fleets typically within an extremely controlled budget framework. Due to the communication environment onboard the vehicles, voice communication in these networks is tightly regulated and mainly dominated by downlink group communication. On the other hand, due to extensive use of vehicle location systems, there exists a need to deliver small amounts of location data frequently from the vehicle to the dispatching system. Due to the specific size of the location data packets, and the established availability of service during voice communication, TETRA Short Data Service (SDS) is considered an optimal bearer for this purpose.

The SDS messages are delivered in signalling channels, which are shared by all mobile stations of the system. Because these signalling channels, especially the Main Control Channel (MCCH), also carry messages related to, for example, random access and call setup, the temporary load of MCCH has a big effect on the success of these functions, and thus additional load incurred by e.g. the delivery of location data needs to be carefully considered. Extensive use of vehicle tracking easily leads to a situation where, in order to provide sufficient MCCH capacity, the number of sites would have to be considerably increased, even though there was no need for additional traffic channel capacity. All related costs considered, such an arrangement is far from optimal.

Generically the problem of load accumulation to at least one channel by one service or by two or more mutually competing services can inherently be detected in any communication system where mapping of the services is pre-defined, by standard specifications of a standardization body or by de facto standards, or internally during product creation process (proprietary systems), to a limited number of channels. As for TETRA, this shows, when used for public transportation communication system, as loads incurred to the main signalling channel by essentially simultaneous delivery of e.g. location data, random access and call setup signalling.

A mechanism introduced in the prior art is the increase of the critical capacity by increasing the amount of the channels that will potentially get congested. For example, in the TETRA standard this has been brought up as a definition of secondary control channels. For each TETRA base station there is one MCCH, in one of the slots of the main carrier of the base station. To increase the signalling capacity, one or more additional slots of the main carrier can be assigned as Secondary Control Channels (SCCH). However, though the signalling capacity is hereby increased, definitions related to the use of secondary control channels are quite rigid and do not accommodate dynamic changes that, on the other hand, are typical of most of the use cases where additional MCCH capacity is needed. A solution, where dynamic changes, e.g. in the operations or organisations of the users, would incur mandatory visits to all the sites in the network, is not viable as such for this purpose. It should be noted that the installed base of TETRA systems is already considerable so any changes to the air interface are very unlikely. The preferred solution should not essentially affect the terminal interoperability of the existing networks.

SUMMARY OF THE INVENTION

The invention is directed to a communication system including a plurality of channels, and a first service that utilizes at least a first channel for transmission. A second service utilizes at least a second channel for transmission, and an operating means operates the first service in connection with the second service so that the first service can utilize the second channel. Adjusting means adjusts the utilization of the second channel by the second service at least during a connected operation of the first and second service.

The invention also includes a communication system having a plurality of channels, a first service that utilizes at least a first channel for transmission, and a second service that utilizes at least a second channel for transmission. A plurality of connections of the second service are provided, and operating means operate the first service and at least one connection of the second service, so that the first service can utilize the second channel. Adjusting means adjusts a utilization of the second channel by a connection of the second service at least during connected operation of the first and second service.

The invention also includes a method for operating a communication system that includes a plurality of radio channels. The method includes utilizing at least a first channel for transmission of a first service, and utilizing at least a second channel for transmission of a second service. The first service is operated in connection with the second service so that the first service can utilize the second channel. A utilization of the second channel by the second service is adjusted at least during a connected operation of the first and second service.

BRIEF DESCRIPTION OF THE DRAWINGS

In the following, the invention will be described in greater detail by means of preferred embodiments with reference to the attached drawings, in which.

DETAILED DESCRIPTION OF THE PREFERRED EMBODIMENTS

In the following, the invention is described using the terms and elements of the TETRA air interface as specified in the European Telecommunication Standards ETSI ETS 300 392-2, however, without limiting the invention to this one radio system technology. The present invention can be applied to any communication system, the services of which utilise the available channels according to one or more protocols. Examples of such systems are cellular mobile communication systems, such as GSM (Global System for Mobile communications), or corresponding systems, such as PCS (Personal Communication System) or DCS 1800 (Digital Cellular System for 1800 MHz), third generation mobile systems, such as UMTS (Universal Mobile Communication System) and systems based on the above-mentioned systems, such as GSM 2+ systems and the future $4^{th}$ generation systems. One typical example of a mobile communication system is the public land mobile network PLMN.

Figure 1:
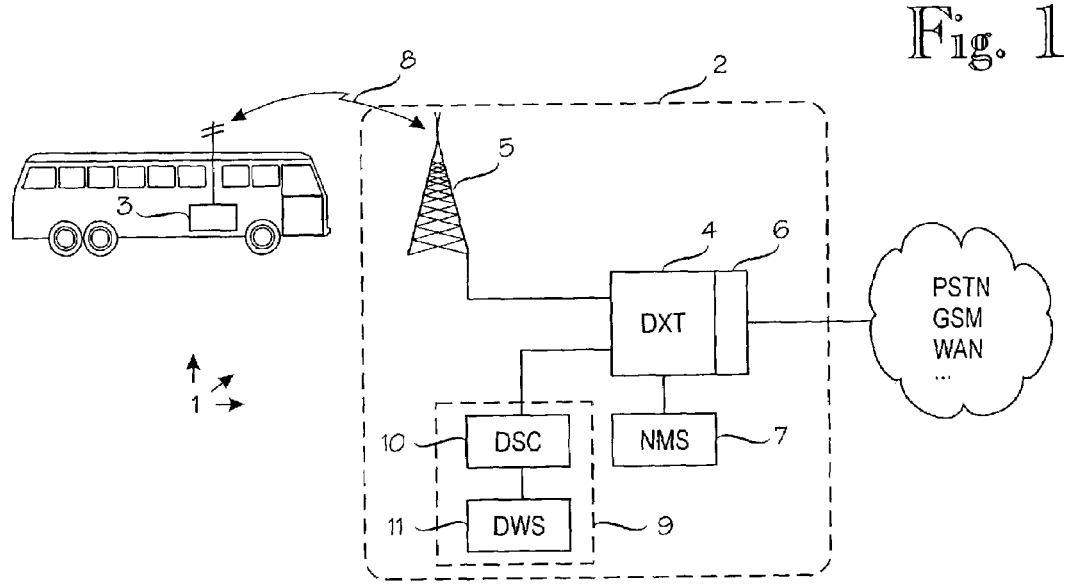
FIG. 1 shows a simplified illustration of a first embodiment of the invention.

FIG. 1 shows a simplified illustration of the main elements of the first embodiment of the invention. The arrangement comprises a mobile radio system 1 that comprises at least a switching and management infrastructure (SwMI) 2 and a mobile station (MS) 3. SwMI 2 is equipment for a voice plus data (V+D) network, which enables the subscriber terminals to communicate with each other. In FIG. 1, SwMI comprises one digital exchange (DXT) 4 and one base station (TBS) 5, but naturally the type and number of elements and their interconnections can vary according to the specific system and implementation. For example, in GSM/GPRS-based systems the base station functionality is divided into separate units like Base Station Controller and Base Station, and support nodes like GGSN (Gateway GPRS Support Node) and SGSN (Serving GPRS Support Node) are utilised in data transmission. Thus, the type and number of units that constitute SwMI is not essential to the invention as such. An interface block 6 denotes the various interfaces of the digital exchange, which facilitate connections between the mobile stations and for example the internal or external data networks, other analog or digital mobile systems, public switched telephone network, and the like. The operation of the radio system is monitored and controlled by a network management system 7 connected to the digital exchange either directly through a suitable connecting interface, or via Local Area Network (LAN) or Wide Area Network (WAN) using a suitable network protocol, like IP.

Of the subscriber terminals, the mobile station (MS) 3 is arranged to access SwMI via an air interface 8. In addition to this, in some systems, like TETRA, there is also provided a dispatching system 9 for facilitating the dispatching communication. The dispatching system is typically a combination of dispatcher station controllers 10 and one or more dispatching workstations 11, or a system of servers and workstations connected therewith. The dispatching system communicates with SwMI using a suitable network protocol, for example E1, ISDN-BA, or IP. The dispatching workstation 11 can communicate with the other subscribers of the network and/or manage system, subscriber, group and/or organisation-specific parameters of the radio system. In some systems, all or part of this subscriber management functionality can be in the network management system.

Figure 2:
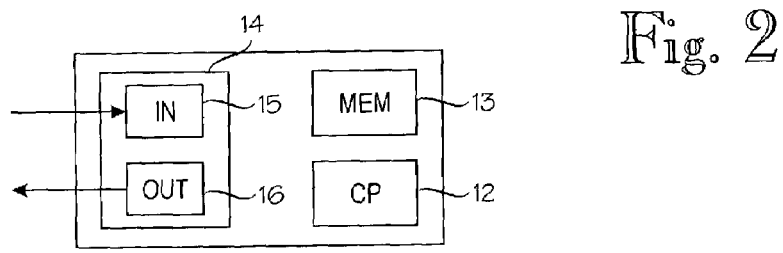
FIG. 2 illustrates schematically the basic functional structure of a unit of the communication system.

FIG. 2 illustrates schematically the basic functional structure of a unit 3, 4, 5, 10, 11 of the mobile radio system of FIG. 1, including the possible servers comprised in it. The unit includes processing means 12, an element that comprises an arithmetic logic unit, a number of special registers and control circuits. Connected to the processing means are memory means 13, data medium where computer-readable data or programs, or user data can be stored. The memory means typically comprise memory units that allow for both reading and writing (RAM), and memory whose content can only be read (ROM). The unit also comprises an interface block 14 with input means 15 for inputting data for internal processing in the unit, and output means 16 for outputting data from the internal processes of the unit. Examples of said input means comprise a plug-in unit acting as a gateway for the information delivered to its external connection points, a keypad, or a touch screen, a microphone, or equal. Examples of said output means comprise a plug-in unit feeding information to the lines connected to its external connection points, or a screen, a touch screen, a loudspeaker, or equal. The processing means 12, memory means 13, and interface block 14 are electrically interconnected for performing systematic execution of operations on received and/or stored data according to the predefined, essentially programmed processes of the unit.

Figure 3:
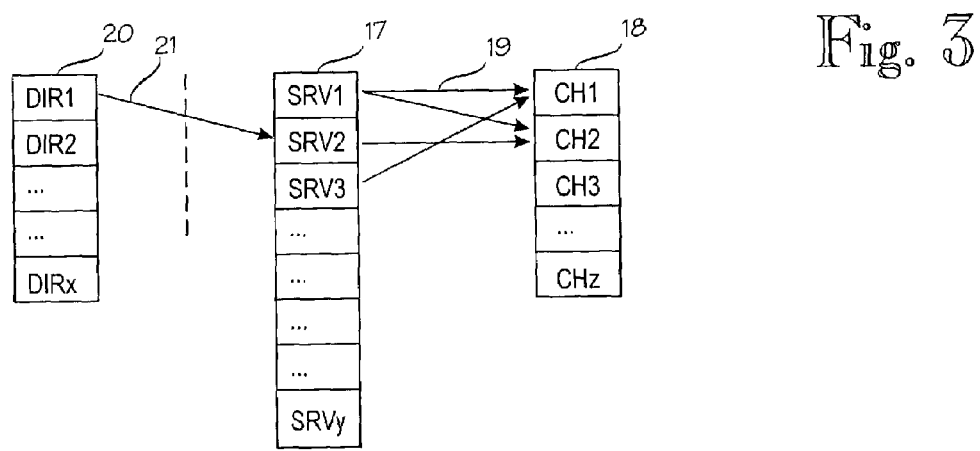
FIG. 3 illustrates schematically the dependencies between the main definitions of the invention.

FIG. 3 illustrates schematically the dependencies between the main definitions of the described embodiment. The mobile radio system 1 provides a set of services 17 SRV1, SRV2, . . . , that form all or part of the message transmission or switching in a telecommunications network. A service essentially provides the complete capability, including terminal equipment functions, for communication between users according to established protocols. These protocols can be established for example by agreement between telecommunications companies, typically by standardisation, or as definitions during the product creation process. A connection is a transmission opportunity between two or more points, and the system typically provides both services that require connection and connectionless services. In the definition of these protocols, the mapping 19 of the services 17 to the channels 18 (physical and/or logical) is essentially explicitly or implicitly decided. Thus the parts 17, 18 separated by the dashed line represent the areas essentially covered by the pre-defined specifications.

Typically, not all the services available in the system are available for the subscribers as such. The availability of the services for the subscribers depends e.g. on the capabilities of the terminal used, and the terminal options chosen by the user, and can also be controlled by the switching and management system. Control from the infrastructure side is preferably done through parameters, variables whose values affect the operation of a system. In commercial systems, the availability of the services is generally compiled into a user profile, meaning that the subscriber will choose which services he plans to utilize, and then pays for them only. In professional use, radio communication is typically quite strictly regulated by the operating procedures of the company, or industry practices. For example, in public transportation the onboard communication is strongly regulated. A frequent requirement is that the vehicle driver should not be allowed to initiate a call, but only to be able to send an uplink message (callback request) to inform the dispatcher about a need for an open voice connection. To ensure this, and prohibit any misuse, the actual mobile station of the radio system is hidden behind a board computer with only a limited number of buttons for the allowable operations available for the drivers.

Thus, in terms of FIG. 3, on the other side of the dashed line is the set of directives 20, DIR1, DIR2, . . . , that regulate the operations of the subscribers, and among other things, define how the subscribers can utilise the services 17 of the system. In practise this means that for every network and even for every user segment, the set of directives 20 is unique. The mapping 21 of the directives 20 to the available system services 17 is preferably done by parameters, though naturally the use of fixed definitions or similar are possible as well.

In the system according to an embodiment of the invention, the channel CH1 of the group of channels 18 is, according to a defined protocol, utilized by a service SRV1. Simultaneous activations of this service SRV1 compete of the channel resource of CH1, and thus the successful activation of this service SRV1 by far depends on the sufficiency of the channel resource of CH1. On the other hand, it is identified that the services SRV1, SRV2, when used in connection, can utilize the channel CH2 in such a way that the channel resource in at least one transmission direction can also be utilized by the service SRV1. By initiating such connected operation of services SRV1 and SRV2, the load to the channel CH1 in said one transmission direction can be significantly reduced, and thus the successful employment of the service SRV1 improved. Typically, but not necessarily, the channel CH1 can be utilized by at least one other service SRV3, which also competes of the channel resource of CH1. Thus managing the capacity in the invented manner typically improves the employment of this other service SRV3 as well.

In the solution according to the invention the utilisation of the channel CH2 in the chosen transmission direction by the service SRV2 during the connected operation is adjusted to facilitate rational use of the channel during said connected operation. The adjustment can mean for example adjusting the way the two services SRV1, SRV2 compete of the channel resource, or setting the utilisation ratio of the services SRV1, SRV2 to some fixed or dynamically adjustable level between 0 and 1. Furthermore, the causality between the services 17 and the directives 20 can be utilised. There can be a directive DIR1 that regulates the use of the service SRV2 by prohibiting from it the communication in one transmission direction. It is then clear that this communication direction can be essentially blocked from the service SRV2 and the channel capacity of CH2 be utilised by SRV1. And vice versa, if noted that the described connected operation of the services SRV1, SRV2 is necessary, a directive DIR1 that prohibits the use of SRV2 in this one transmission direction can be issued.

In the preferred embodiment, for example, in said absence of uplink call initialisation due to operating regulations (cf. DIR1), parts of uplink channels both in individual and group call services are essentially redundant. On the other hand, it is appreciated that, according to the standard, during the semi-duplex group and individual calls, a Fast Associated Control Channel (FACCH) is opened in the uplink direction while speech is being transferred in the downlink direction. Mobile stations that support the utilization of simultaneous mobile originated SDS and voice data service can utilize FACCH in sending SDS messages during a call. In order to facilitate, for example, the frequent transmission of uplink SDS messages for delivery of location information, the dispatcher can thus initiate a semi-duplex group call (cf. SRV2) to a pre-defined group, whereby the entire uplink capacity (cf. CH2) is free for uplink SDS delivery (cf. SRV1) for the group members. At the same time, the downlink direction is open for announcements etc.

The pseudo open channel arrangement for group calls, as specified by TETRA standards, means that in normal operating conditions the call would be terminated after a pre-defined latency time if during that time there are no requests for speech items by any of the group members. Typically the latency times are defined quite short, and therefore the parameterisation of the system needs to be adjusted so that the group call established for facilitating the additional capacity for delivery of short messages (later referred as messaging group call) will not terminate unintentionally. This can be implemented, for example, by a dispatcher application that continually sends speech item requests before the lapse of latency time. Alternatively, if the latency time of the system is a group-specific parameter, it can be adjusted to be very long so that the group call will continue for an appropriately long time. The means for adjusting the messaging group call length are not essential to the invention as such. According to the standard, when a member of a group call is granted a speech item, the uplink FACCH will change into TCH. In order to prevent this, the way the second service utilizes the second channel needs to be adjusted. The system can, for example, be parameterised to decline all uplink transmission requests for that service in that particular group. Alternatively, the mobile stations can be adjusted not to send speech item requests during the time of the messaging group call. The means for adjusting the availability of the channel in the chosen transmission direction in the messaging group call are not essential to the invention as such. Participation to a normal group call is still possible, for instance, when the mobile station due to priority scanning moves over to another group whose priority is higher than the one of the messaging group call. Correspondingly, when the group call of higher priority is terminated, the mobile station will change over to another call with the currently highest priority, which typically means that it returns back to the original group call.

The initiation of a connected operation according to this example of the invention can be implemented manually or automatically, and the decision criterion, i.e. the event that triggers the connected operation, is an implementation-specific choice. For example, a dispatcher or a network operator can simply decide to initiate the operation manually, if he receives too many complaints on channel congestion. If load monitoring is available, the operation can for example be arranged to initiate automatically as a response to the monitored load exceeding a pre-defined threshold. The operation can also be initiated in advance when an increased usage of the first service is anticipated. Such an occasion could be, for example, a big event like a football game, etc where the amount of professional communication typically peaks. Correspondingly, it should be noted that the invention is not limited to the initiation by the dispatcher as shown in the described embodiment. Depending on the technology implemented and the elements involved, the initiation can be performed by any functional unit of the network with an appropriate functionality, for example a service terminal, network management system or an application integrated to the system.

An advantage of the invention is that the existing capacity of the system can be utilized to dynamically balance the load on one or more channels, and thereby reduce the possible channel capacity waste. Furthermore, the utilization of a solution according to the invention will not pose essential challenges to the terminal interoperability, only the connected operation of the services SRV1, SRV2 needs to be possible. Another advantage is that such a capacity management operation can be implemented dynamically, which means that essentially no fixed allocations for increased capacity are necessary in the base stations. A channel will be reserved for the group call only at the sites where there are members of the group, and only for the duration of the messaging group call.

In the described preferred embodiment, the arrangement can furthermore be managed with group parameters, which means that due to the possibility of dynamic group allocations over the air, all the enhanced group management functionalities of the TETRA system can be utilized to improve the outcome of the operation according to the invention. This means, among other things, that essentially any individual mobile station can be added to and removed from the group in a messaging group call. Furthermore, the definitions can be made, for example, by one or more of the dispatching workstations with appropriate authorisations anywhere in the whole network, or even be arranged as an automated, location-based definition.

Figure 4:
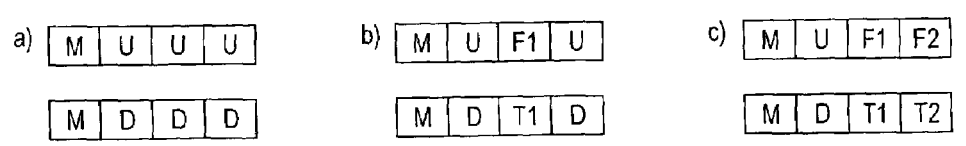
FIG. 4 shows a schematic diagram on the principle of the arrangement of the first embodiment.

In a further aspect of the invention, the capacity is dynamically adjusted according to the temporary load in the related channels. The principle of the arrangement is illustrated with an embodiment shown in the schematic diagrams of FIG. 4. In each of the diagrams, one downlink TDMA frame (in this embodiment TETRA TDMA, not frame 18) and a corresponding uplink TDMA frame are shown. Option a) corresponds to a normal (prior art) situation, wherein the first timeslot of the TDMA frame comprises the main control channel MCCH (marked as M), which among other things carries the SDS messages in the uplink and downlink directions. The other timeslots of the frame are marked with U for uplink timeslots and D for downlink timeslots. Whether the U and D are allocated to connections or not is not essential in this context.

According to an embodiment of the invention, following the specific decision criteria of the implementation, for example in order to reduce the MCCH load due to SDS delivery, the dispatcher will create (or take into use an already created) group of subscribers, and initiate a semi-duplex group call in that group. This situation is illustrated in option b). In this situation, a downlink timeslot T1 is interpreted as a traffic channel TCH and the corresponding uplink timeslot F1 is interpreted as a FACCH that, as long as the group call is ongoing and the speech item is with the dispatcher, can be utilized for the delivery of uplink SDS messages. However, in case it is noticed that the capacity of this one FACCH is not enough and congestion occurs, the dispatcher can use the standardized over-the-air group management feature to manipulate the population in the messaging group call. He can, for example, divide the original group into further groups, and initiate a new messaging group call in each of these new groups and thus arrange additional capacity for the uplink SDS message delivery. Correspondingly, in case it is noted that the capacity arranged for the uplink message delivery is excessive, the dispatcher can combine such groups of the messaging group call together and thus again adjust the additional capacity to meet the requirement. This embodiment is very suitable for communication in public transportation, where the amount of vehicles on duty varies very much according to the time of the day and the day of the week.

In systems with an effective network management system, the load to different channels can also be actively monitored. In such systems, an embodiment of the invention for managing channel capacity can be initiated, preferably automatically, in response to the signals from the network management system. For example, referring to FIG. 1, the network management system 7 can include an allowed range for the channel load. In case the upper or lower limit is exceeded, the network management system will induce an alarm signal to the digital exchange 4. The digital exchange 4 will forward the signal to a dispatcher application 11 that will initiate the operations for establishing a messaging group call as described earlier. As described earlier, other means for initiating the operations are naturally possible.

Figure 5:
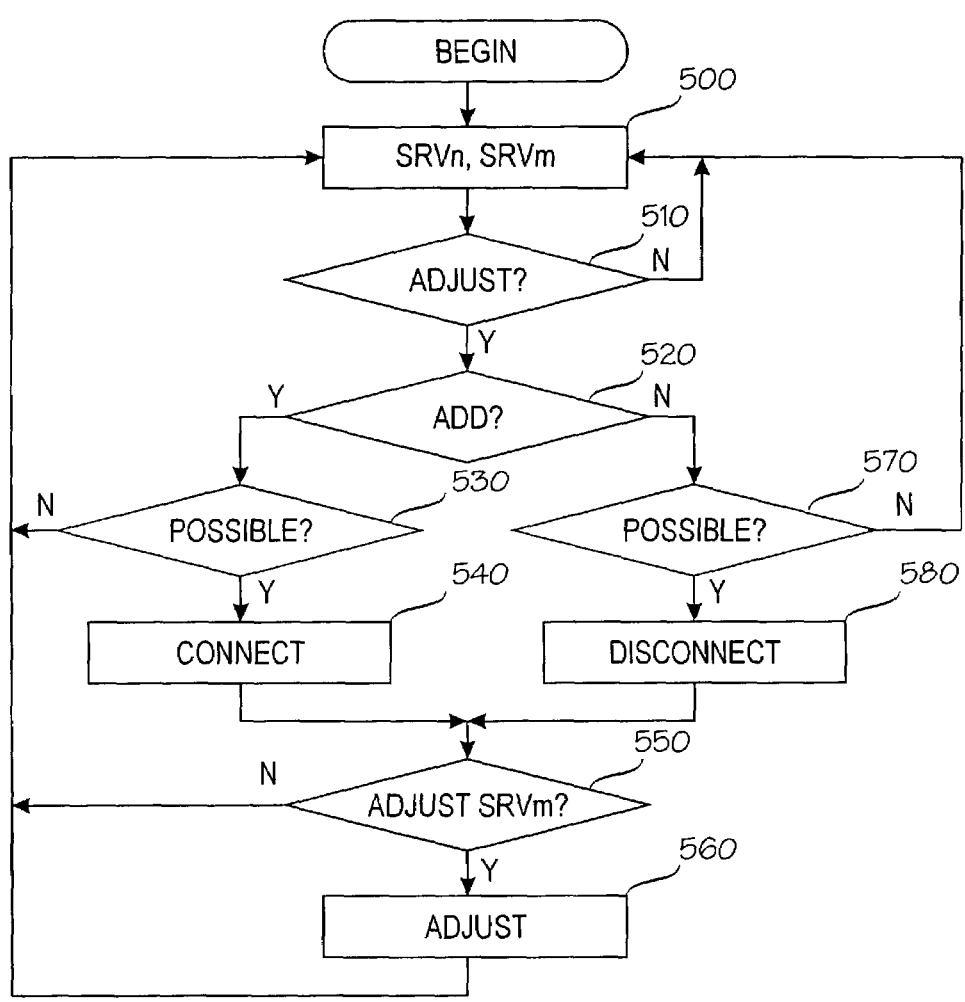
FIG. 5 shows a flow chart of the method of the first embodiment of the invention.

In FIG. 5, a flow chart of the method for operating an embodied radio system according to the invention is shown. In step 500, the radio system is operated with the channels utilized by the services according to the pre-defined protocol and potentially adjusted by the earlier rounds of the invented method. In step 510, it is checked whether there is a need to adjust the channel capacity for the successful employment of the service SRVn. If the channel capacity is adequate, and there is no need to make adjustments, the process will return back to step 500. If there is a need to make an adjustment, it is checked (step 520) whether an increase or decrease of channel capacity is necessary. If the capacity is deficient, the process will move to step 530 where it is checked whether increasing the capacity is possible, i.e. whether there are still channels available to utilize for the connected operation of services. If channels are no longer available, the process will move back to step 500. If there are channels available, the connected operation of the services SRVn, SRVm in the channel CHk is initiated (step 540). When the connected operation is initialized, it is also checked whether there is a need to adjust the operation of the service SRVm (step 550). If that is not necessary, the process will move back to step 500. If the adjustment is necessary, it is taken (step 560), after which the process will move back to step 500. In step 520, if the capacity is deemed excessive, the process will move to step 570 where it is checked whether decreasing the capacity is possible, i.e. whether there are channels utilized for the connected operation of services. If there are no utilized channels, the process will move back to step 500. If at least one of such connected operations exists, the connected operation of the services SRVn, SRVm in the channel CHk is terminated (step 580).

Figure 6:
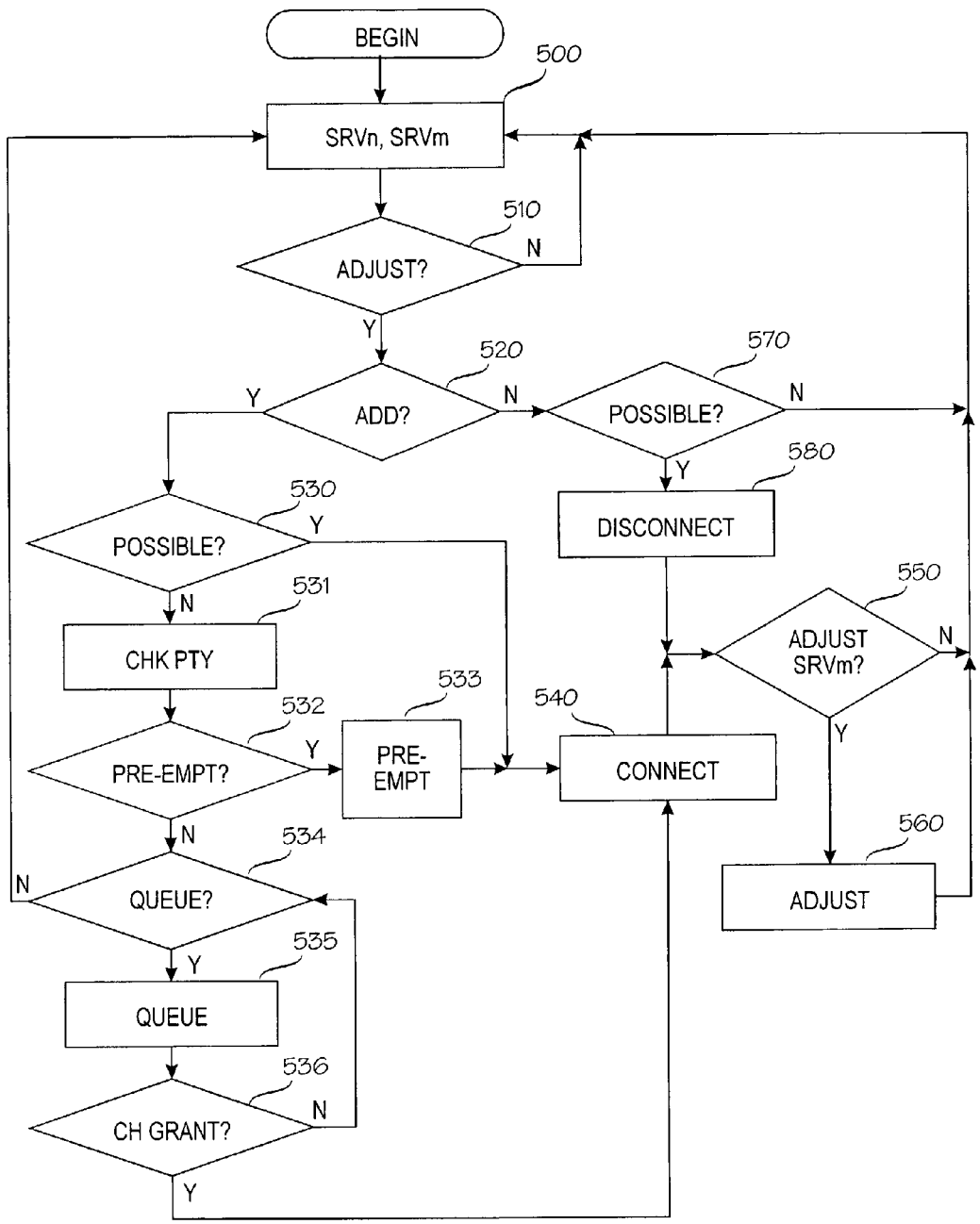
FIG. 6 shows a flow chart of a further embodiment of the invented method.

In FIG. 6, a further embodiment utilizing the principles of prioritisation is illustrated. The steps 500 to 580 correspond directly to the steps 500 to 580 of FIG. 5, and a number of new steps 531 to 536 of the present embodiment are added. As in step 530 of FIG. 5, in step 530 of FIG. 6, it is checked whether increasing the capacity is possible, i.e. whether there are still channels available to utilize for the connected operation of services. If there are no channels available, the priority of the messaging group call is checked (step 531). If the priority is defined high enough to cause a pre-emption of one of the occupied channels (step 532), a channel is pre-empted for the messaging group call (step 533), and a messaging group call is set up (step 540). If the priority is not high enough for pre-emption, it is checked whether there is a definition for the messaging group call to queue (step 534). If not, the process will move back to step 500. If queuing is allowed, the messaging group call will start queuing for the channel resource (step 535). If the channel is granted, a messaging group call is set up (step 540). If not it is checked whether queuing should be continued or terminated (step 534).

An additional advantage of this embodiment is the possibility for enhanced continuity of service. Traditionally, in the initiation of a connection or during the queuing of resources, it is often impossible to utilize any service at all. In a solution according to the second embodiment, the group in a messaging group call can continuously transmit messages in one group while the operations to allocate the necessary additional messaging capacity can be taken care of by the system. According to the prioritisation defined for the individual messaging group call, the channel resources can be queued or even pre-empted as shown in FIG. 6. A further advantage of the second embodiment is the possibility to improve the probability of service for a defined sub-group of users. For example, if the prioritisation of messaging at some instance is deemed extremely important, it is possible to prioritise the first messaging group call, let the original group continue transmitting messages in it, initiate a new messaging group call with a lower priority and move the users with lesser prioritisation to the second messaging group call. This way, the grade of service for the users in the original messaging group call can be notably improved without causing any unnecessary disturbance to the messaging activity of the users of a lesser priority.

It will be obvious to a person skilled in the art that, as the technology advances, the inventive concept can be implemented in various ways. The invention and its embodiments are not limited to the examples described above but may vary within the scope of the claims.

The invention claimed is:

1. A communication system, comprising:
   a plurality of channels, a channel providing channel resources in a first transmission direction and in a reverse second transmission direction, channel resources of a first group of channels providing a first channel resource and channel resources of a second group of channels providing a second channel resource;
   a first service pre-defined to utilize in transmission at least the first channel resource;
   a second service pre-defined to utilize in transmission at least the second channel resource;
   opening means for opening a connection for transmissions in at least one transmission direction;
   operating means for operating the first service in connection with the second service so that while a defined channel of the second channel resource is allocated for the connection, channel resources of this defined channel are utilized in transmissions of the first service and in transmissions of the second service; and
   adjusting means for adjusting the utilization of the channel resources of this defined channel by the second service at least during a connected operation of the first and the second service.

2. The communication system according to claim 1, wherein the operating means comprises terminating means for terminating the connected operation of the first service and the second service.

3. The communication system according to claim 2, further comprising a switching and management infrastructure, wherein one or more servers are integrated to the switching and management infrastructure, the one or more servers controlling at least one of said operating means and said adjusting means.

4. The communication system according to claim 3, further comprising a dispatching system with one or more dispatching workstations, wherein the one or more servers comprise dispatching workstations.

5. The communication system according to claim 1, wherein the second service is activated according to at least one directive.

6. The communication system according to claim 5, wherein said at least one directive comprises prohibiting initialization of transmissions of the second service in one transmission direction.

7. The communication system according to claim 1, wherein the first service is a short message service and the second service is a semi-duplex group call.

8. The communication system according to claim 1, wherein the first service is configured to operate in connection with the second service during a time they are essentially simultaneously activated.

9. The communication system according to claim 1, further comprising a plurality of mobile stations, and at least one group formed by at least one mobile station of said plurality of said mobile stations, wherein operations of at least one of said operating means and said adjusting means are directable at said group.

10. The communication system according to claim 9, further comprising a switching and management infrastructure, wherein one or more servers are integrated to the switching and management infrastructure, the one or more servers controlling at least one of said operating means and said adjusting means, wherein the one or more servers are configured to allow for individual mobile stations to be added to and removed from the group of mobile stations.

11. The communication system according to claim 10, further comprising a dispatching system with one or more dispatching workstations, wherein the one or more servers are dispatching workstations.

12. The communication system according to claim 1, the system further comprising a switching and management infrastructure and at least one mobile station,
   wherein a connection between the mobile station and the infrastructure comprises at least one radio channel in the first and in the reverse second transmission direction,
   wherein the operating means are configured to provide the connected operation of the first and the second service in at least one transmission direction, and
   wherein the adjusting means are configured to adjust the utilization of the radio channel in one transmission direction during the connected operation of the first and the second service.

13. A communication system, comprising:
- a plurality of channels, a channel providing channel resources in a first transmission direction and in a reverse second transmission direction, channel resources of a first group of channels providing a first channel resource and channel resources of a second group of channels providing a second channel resource;
- a first service pre-defined to utilize in transmission at least the first channel resource;
- a second service pre-defined to utilize in transmission at least the second channel resource;
- operating means for opening a plurality of connections of the second service;
- operating means for operating the first service in connection with at least one connection of the second service so that while a defined channel of the second channel resource is allocated to the connection of the second service, the channel is utilized in transmissions of the first service and in transmissions of the second service; and
- adjusting means for adjusting the utilization of the channel resources of this defined channel by the connection of the second service at least during a connected operation of the first and the second service.

14. The communication system according to claim 13, wherein said communication system further comprises connecting means for initiating a new connection of the second service for the connected operation of the first service and the second service.

15. The communication system according to claim 14, further comprising monitoring means for monitoring the load in the second channel resource utilized by the first service,
- wherein the connecting means are configured to initiate a new connection of the second service for the connected operations of the first and the second service in response to the monitored load exceeding a pre-defined threshold.

16. The communication system according to claim 15, wherein said connecting means are configured to terminate at least one connection of the second service for the connected operation of the first and the second service in response to the monitored load going under a pre-defined threshold.

17. An element for a communication system, the element comprising:
- an interface block configured to communicate over a plurality of channels, a channel providing channel resources in a first transmission direction and in a reverse second transmission direction, channel resources of a first group of channels providing a first channel resource and channel resources of a second group of channels providing a second channel resource;
- a first service pre-defined to utilize in transmissions at least the first channel resource;
- a second service pre-defined to utilize in transmissions at least the second channel resource; and
- opening means for opening a connection for transmissions in at least one transmission direction;
- processing means for operating the first service in connection with the second service so that while a defined channel of the second channel resource is allocated for the connection, channel resources of this defined channel are utilized in transmissions of the first service and in transmissions of the second service,
- wherein the processing means are further configured to adjust the utilization of the channel resources of the defined channel by the second service at least during the connected operation of the first and the second service.

18. The element according to claim 17, wherein the element is a server of a dispatching system.

19. The element according to claim 17, wherein the element is a workstation of a dispatching system.

20. A method for operating an element of a communication system, the method comprising:
- operating in the element a plurality of radio channels, a radio channel providing channel resources in a first transmission direction and in a reverse second transmission direction, channel resources of a first group of channels providing a first channel resource and channel resources of a second group of channels providing a second channel resource;
- pre-defining at least the first channel resource for transmissions of a first service;
- pre-defining at least the second channel resource for transmissions of a second service;
- opening a connection for transmissions in at least one transmission direction;
- operating the first service in connection with the second service so that while a defined channel of the second channel resource is allocated for the connection, channel resources of this defined channel are utilized in transmissions of the first service and in transmissions of the second service; and
- adjusting the utilization of the channel resources of the defined channel by the second service at least during a connected operation of the first and the second service.

21. The method according to claim 20, further comprising:
- initiating a connection of a second service;
- operating the first service in connection with the second service so that while a defined second channel resource is allocated for the second service, this defined second channel resource is utilized for the transmissions of the first service; and
- adjusting the utilization of the second channel resource by the connection of the second service at least during the connected operation of the first and the second service.

22. The method according to claim 21, further comprising:
- monitoring a load in the second channel resource utilized by the connection of the first service; and
- initiating a new connection of the second service in response to the monitored load exceeding a pre-defined threshold.

23. The method according to claim 22, further comprising:
- terminating at least one connection of the second service for the connected operation of the first and the second service in response to the monitored load going under a pre-defined threshold.

24. The method according to claim 21, further comprising:
- receiving a request for a connection of the second service for the connected operation of the first and the second service;
- defining a priority grade for the requested connection of the second service;
- checking whether a channel of the second channel resource is available for the requested connection;
- comparing, in response to the channel resource not being available, a priority grade of the requested connection of the second service with priority grades of other simultaneously active connections of the second service; and
- prioritizing the request for the connection of the second service according to a result of the comparison.

25. A computer-readable storage medium encoded with a computer program comprising computer code for executing a computer process for operating a communication system, wherein the communication system comprises a plurality of channels, a channel providing channel resources in a first transmission direction and in a reverse second transmission direction, channel resources of a first group of channels providing a first channel resource and channel resources of a second group of channels providing a second channel resource, a first service pre-defined to utilize in transmission at least a first channel resource, and a second service pre-defined to utilize in transmission a second channel resource, the computer process comprising:

opening a connection for transmissions in at least one transmission direction;

operating the first service in connection with the second service so that while a defined channel of the second channel resource is allocated for the connection, channel resources of this defined channel are utilized in transmissions of the first service and in transmissions of the second service; and adjusting the utilization of the channel resources of this defined channel by the second service at least during a connected operation of the first and the second service.

26. A communication system, comprising:

a plurality of channels, a channel providing channel resources in a first transmission direction and in a reverse second transmission direction, channel resources of a first group of channels providing a first channel resource and channel resources of a second group of channels providing a second channel resource;

a first service pre-defined to utilize in transmission at least the first channel resource;

a second service pre-defined to utilize in transmission at least the second channel resource;

a connector for opening a connection for transmissions in at least one transmission direction;

an operator configured to operate the first service in connection with the second service so that while a channel of the defined second channel resource is allocated for the connection, channel resources of this defined channel are at a same time utilized in transmissions of the first service and in transmissions of the second service; and an adjustor configured to adjust the utilization of the channel resources of this defined channel by the second service at least during a connected operation of the first and the second service.

27. An element of a communication system, the element comprising:

an operator configured to operate a first service in connection with a second service so that while a defined channel of a second channel resource is allocated a connection, channel resources of this defined channel are at a same time utilized in transmissions of the first service and in transmissions of the second service; and an adjustor configured to adjust the utilization of the channel resources of this channel by the second service at least during the connected operation of the first and the second service, wherein the communications system includes a plurality of channels, a channel providing channel resources in a first transmission direction and in a reverse second transmission direction, channel resources of a first group of channels providing a first channel resource and channel resources of a second group of channels providing a second channel resource, the first service is pre-defined to utilize in transmission at least the first channel resource, and the second service is pre-defined to utilize in transmission at least the second channel resource.

\* \* \* \* \*